United States Patent [19]

Kawolics et al.

[11] 4,271,024

[45] Jun. 2, 1981

[54] LIQUID FILTER

[75] Inventors: Raymond P. Kawolics, Solon; Donald R. Basel, Garfield Heights, both of Ohio

[73] Assignee: Meyer Dairy Products, Co., Cleveland, Ohio

[21] Appl. No.: 41,711

[22] Filed: May 23, 1979

[51] Int. Cl.³ ............................................. B01D 35/38
[52] U.S. Cl. ................................... 210/474; 210/481; 210/483; 99/295; 99/306; D23/4
[58] Field of Search ............ 210/248, 493 R, 464–469, 210/483, 474, 407, 473, 455, 485; 426/433, 77, 82; 99/282, 283, 295, 296, 300, 304, 306; D7/129; D23/4

[56] References Cited

U.S. PATENT DOCUMENTS

| 723,091 | 3/1903 | Web et al. | 210/474 |
|---|---|---|---|
| 752,019 | 2/1904 | Adwen | 210/407 |
| 754,053 | 3/1904 | Derham | 210/489 |
| 1,192,332 | 7/1916 | Loewenstein | 210/468 |
| 1,209,051 | 12/1916 | Shotwell | 210/474 |
| 1,246,680 | 11/1917 | Thomas | 210/466 |
| 1,276,992 | 8/1918 | Tadejevich | 210/468 |
| 1,480,413 | 1/1924 | Pedersen | 210/485 |
| 1,725,305 | 9/1929 | Raney | 210/493 |
| 1,831,923 | 11/1931 | Meyer | 210/489 |
| 1,889,543 | 11/1932 | Coors | 210/477 |
| 3,543,940 | 12/1970 | Schmidt, Jr. | 210/490 |
| 3,651,947 | 3/1972 | Schollhamer | 210/474 |
| 3,695,168 | 10/1972 | Van Brunt | 99/306 |

FOREIGN PATENT DOCUMENTS 614285 12/1948 United Kingdom ............... 210/466

*Primary Examiner*—Charles N. Hart
*Assistant Examiner*—E. Rollins Cross
*Attorney, Agent, or Firm*—Fay & Sharpe

[57] ABSTRACT

A permanent, reuseable liquid filter comprised of a thin flexible filter material and a support skeleton secured to the outside surface thereof. The skeleton includes a centrally disposed support rim and a plurality of support rib sets spaced around and extending outwardly from the support rim. Each rib set comprises a plurality of separate elongated ribs extending from adjacent the support rim toward the filter material outer edge with the ribs of each set being connected together by a first connecting web. A second connecting web may be advantageously used to connect each support rib set to the support rim. The filter is normally in a generally flat condition and automatically assumes the general shape of a filter basket or other support structure upon installation thereinto. The support rim then generally defines a filter bottom area with the ribs urging the remainder of the filter material toward engagement with the filter basket or support structure side wall area. Any necessary filter material folds required to accommodate folding from the generally flat condition are formed between adjacent support rib sets and extend generally coextensive therewith.

19 Claims, 5 Drawing Figures

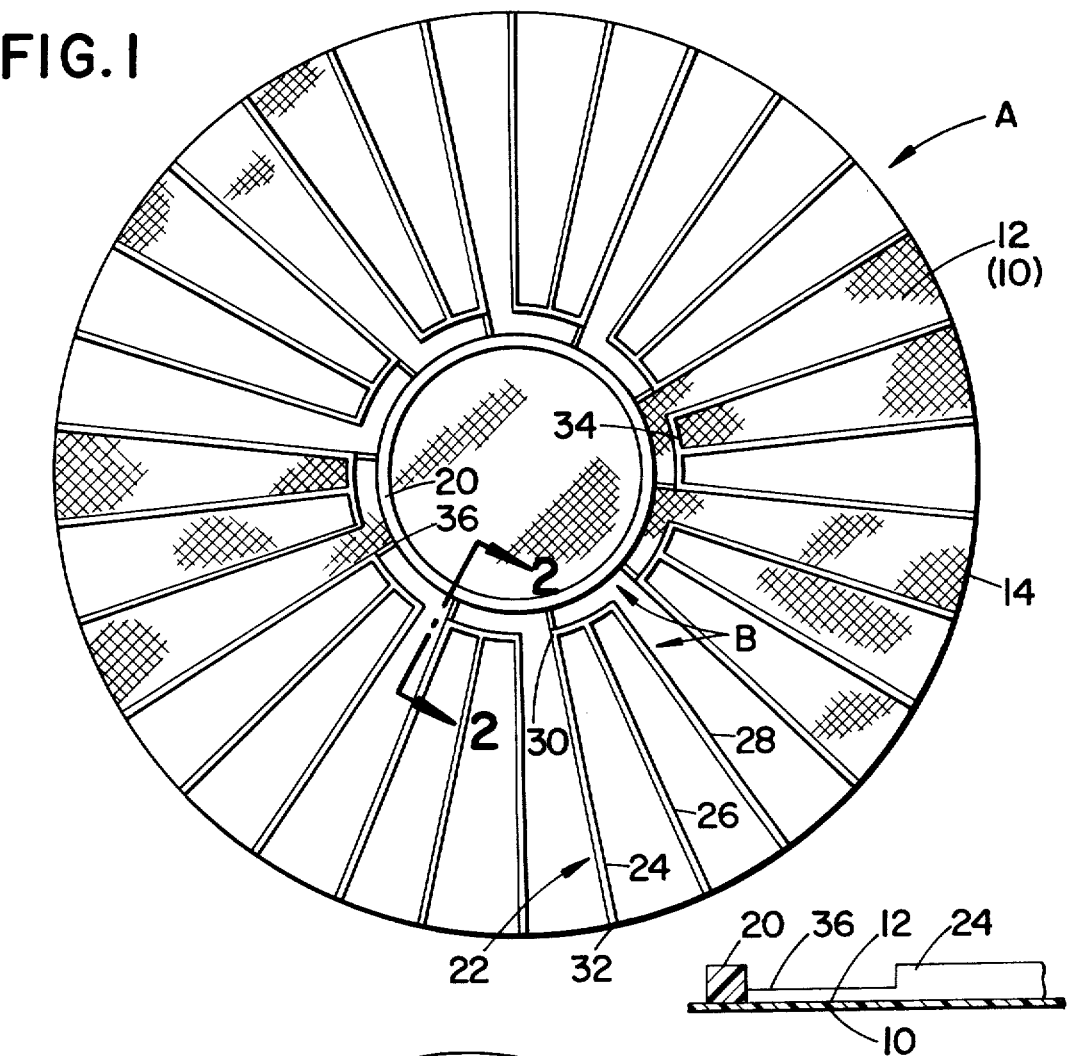
FIG. 1
FIG. 2
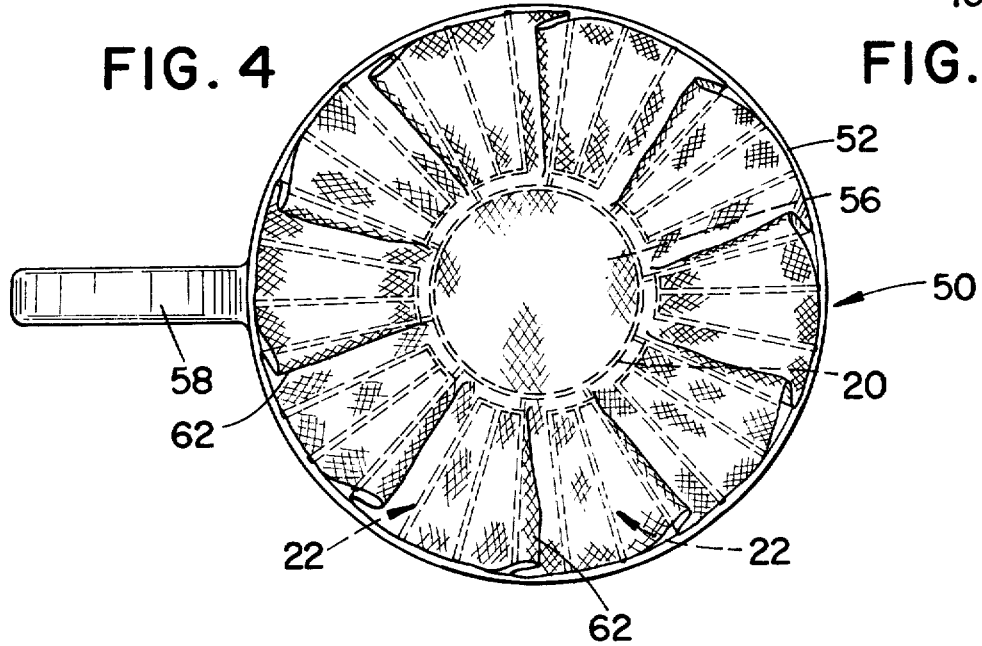
FIG. 4

LIQUID FILTER

BACKGROUND OF THE INVENTION

This invention pertains to the art of filters and more particularly to liquid filters.

The invention is particularly applicable to a permanent, reuseable and foldable filter for automatic coffee brewing apparatus and will be described with particular reference thereto. However, it will be appreciated by those skilled in the art that the concepts of the invention have broader applications and may be utilized in other environments and apparatus for filtering other liquids and liquid-like substances.

Drip type coffee makers have been used in commercial establishments for many years. In recent years, however, drip type coffee makers for home use have been introduced into the marketplace and have received wide customer recognition. Basically, drip type coffee makers utilize prepackaged or a measured amount of dry coffee granules placed in a filter basket which communicates with a source of hot water. A predetermined amount of hot water is introduced into the filter basket to intermix with the coffee granules and be converted into coffee. This coffee then flows from the bottom area of the filter basket into a conventional serving container or carafe. Typical of such home type drip coffee makers are those manufactured by North American Systems, Inc. of Cleveland, Ohio under the trademark MR. COFFEE.

In conjunction with drip coffee makers, a filter is inserted into the filter basket which, in turn, receives the coffee granules. This filter acts to prevent the granules or grounds themselves from undesirably passing through the filter basket into the serving container or carafe. Heretofore, the vast majority of these filters have been constructed from a paper-like material. As such, they are only useable once and are then discarded along with the coffee grounds when brewing has been completed. The paper filters are packaged in quantity and typically have a generally cup-shaped configuration with a flat bottom wall area and a pleated side wall. Because of this shape, the quantity packaging requires added shelf storage space. Moreover, the pleated side wall can allow passage of hot water between the filter basket side wall and filter without contacting the coffee granules to thereby dilute the coffee being brewed.

It has been desired to develop and provide a permanent type, reuseable filter for use in conjunction with drip type coffee making apparatus. While there have been some prior efforts in this regard, such efforts have resulted in filter structures having a relatively rigid frame or skeleton for supporting a filter material such as a woven polyester monofilament. This frame or skeleton itself has a generally cup-shaped configuration so as to be received in a cup-shaped filter basket. While this prior permanent type, reuseable coffee filter has found commercial success, the overall design does have certain undesirable characteristics.

For example, the rigid skeleton which preforms the filter does not allow substantial variation in the type of filter basket with which it is used so that a wide variety of types and styles are necessarily required to accommodate the coffee brewing apparatus of different manufacturers. Further, the rigid cup-shaped skeleton or frame requires additional materials which increases manufacturing costs and resultant resale costs to the consumer. Still further, since these filters are supplied in a preformed cup-shaped configuration, they necessarily require packaging in somewhat larger boxes or the like. As with the paper filters, this reduces the number of such filters which may be placed on typical store shelves and thereby necessitates more frequent restocking.

Accordingly, it has been found desirable to develop a permanent type, reuseable filter construction which would overcome the aforementioned problems and others which have been encountered with prior filter designs. The present invention provides a new filter design and construction which is easy to manufacture, inexpensive to manufacture, reuseable for an extended period of time, selectively foldable between a generally flat storage condition and a use condition with associated support structure and readily adapted for use in a number of different environments for filtering different liquids.

BRIEF DESCRIPTION OF THE INVENTION

In accordance with the present invention, there is provided a new liquid filter construction. This filter is comprised of a thin, flexible filter material having an outer peripheral edge and a porosity adapted to filter a liquid passing therethrough a predetermined desired extent. A support skeleton for supporting the filter material and for providing a desired filter form when it is placed in cooperative communication with associated structure is affixed to the filter material. This skeleton includes a support rim and a plurality of support ribs or fingers extending outwardly thereof toward the filter material outer peripheral edge.

In accordance with another aspect of the present invention, the skeleton support rim and ribs are constructed from a plastic material and are mechanically bonded to the one face of the filter material. In a preferred arrangement, the filter material comprises a cloth-like construction of material having low moisture absorption characteristics.

According to another aspect of the present invention, the support ribs or fingers comprise a plurality of rib or finger sets. Each such set includes a plurality of adjacent ribs interconnected with one another by at least one first connecting web.

According to a further aspect of the invention, the first connecting webs are disposed at least adjacent terminal ends of the ribs in the associated set which are spaced toward the support rim.

In accordance with another aspect of the invention, each finger set is also connected to the support rim by a second connecting web. In one preferred arrangement, this connecting web generally comprises a radial extension of one of the ribs or fingers in the associated rib or finger set.

The principal object of the present invention is the provision of a new and improved reuseable liquid filter construction.

Another object of the present invention is the provision of such a filter construction which is readily foldable between a first generally flat storage condition and a second condition in cooperative association with some associated support or receiving structure.

A further object of the present invention is the provision of a new reuseable filter construction which is simple and inexpensive to manufacture.

Still another object of the present invention is the provision of a filter construction which is readily adapted to use in a number of different environments for different liquids.

Still other advantages and objects of the subject invention will become readily apparent to those skilled in the art upon a reading and understanding of the following specification and drawings.

BRIEF DESCRIPTION OF THE DRAWINGS

The invention may take physical form in certain parts and arrangements of parts, a preferred and alternative embodiments of which will be described in detail in the specification and illustrated in the accompanying drawings which form a part hereof and wherein:

FIG. 1 is a bottom view of a beverage or coffee filter formed in accordance with the concepts of the present invention;

FIG. 2 is a cross-sectional view taken along lines 2—2 of FIG. 1;

FIG. 4 is a plan view of the filter basket of FIG. 3 with the filter fully inserted thereinto; and, FIG. 5 is a bottom view of an alternative filter construction which incorporates the concepts of the subject invention.

DETAILED DESCRIPTION OF THE PREFERRED AND ALTERNATIVE EMBODIMENTS

Figure 3:
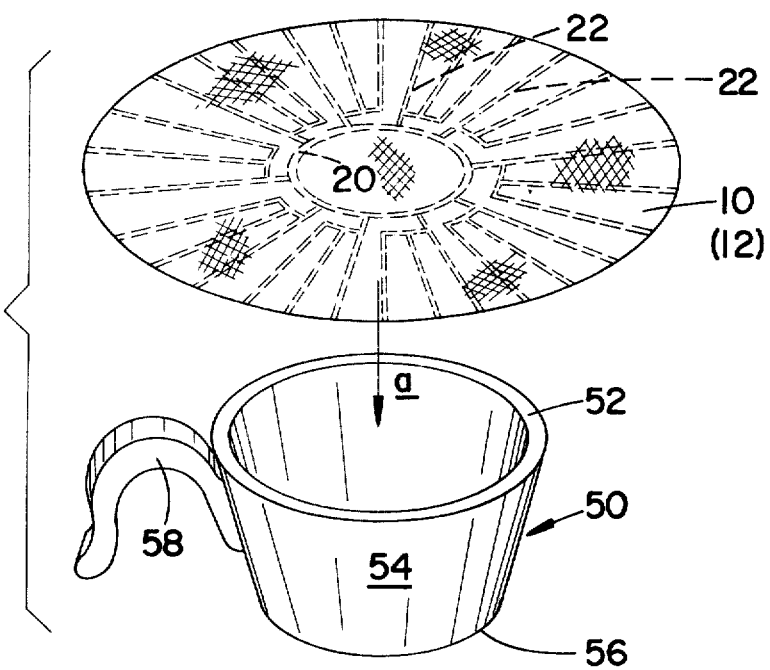
FIG. 3 is a perspective view showing the filter construction of FIG. 1 as it is being inserted into the filter basket and a drip type coffeemaker.

Referring now to the drawings wherein the showings are for purposes of illustrating the preferred and alternative embodiments of the invention only and not for purposes of limiting same, FIG. 1 shows a beverage or coffee filter construction comprised of a thin, flexible filter material A having a support web or skeleton B fixedly secured thereto.

More particularly, filter material A has a flat inner face 10, a flat outer face 12 and an outer peripheral edge 14. In the arrangement shown, and for purposes of utilization in a conventional drip type coffeemaker filter basket, edge 14 is generally circular, although other configurations could also be utilized to accommodate a particular filter application. Filter material A could be comprised of any number of different materials including plastic materials such as polypropylene and polyvinylchloride or could even be constructed from a flexible metallic mesh. However, and in the preferred arrangment here under discussion, a monofilament cloth comprised of a square-mesh screen fabric manufactured from synthetic monofilament yarns is preferred. Such materials are manufactured and marketed by Industrial Fabrics Corporation of Minneapolis, Minn. Other than the desirability for being flexible, having some permanency and having low characteristics of moisture absorption for at least the preferred application disclosed herein, the specifics of filter material A do not, in and of themselves, form a part of the invention and are not, therefore, described in greater detail.

The porosity, permeability or mesh opening sizes of filter material A are selected in a range which will allow the desired flow of coffee therethrough while preventing passage of the coffee grounds. The particular porosity or mesh size will, to some extent, depend upon the specific material utilized for filter material A and will also depend on the intended filter use. Accordingly, it is not deemed necessary to discuss this feature in greater detail herein. Use of a filter material which is low in moisture absorption is desired when the filter is to be employed with coffeemakers in order to prevent absorbing oils from the coffee granules or gounds during extended periods of use. Any such absorption might otherwise render the cofee bitter or rancid.

Web or skeleton B is comprised of a central portion or support rim and a plurality of support ribs or fingers extending radially outward thereof. In FIG. 1, the central portion or support rim is identified by numeral 20 and is generally centrally disposed on outer face 12 of filter material A. As shown, rim 20 is generally circular to define a circular bottom wall in order to accommodate a conventional coffeemaker filter basket as will become more apparent hereinafter. It will be understood, however, that other support rim configurations can also be used to accommodate a particular filter application or use. The ribs or fingers are arranged in a plurality of rib or finger sets generally designated 22 wherein each set is comprised of a plurality of interconnected ribs. In the preferred arrangement, sets 22 are identical with each other and three separate ribs designated 24, 26 and 28 are employed in each set. Each rib, in turn, includes an inner end 30 spaced adjacent support rim 20 and an outer end 32 generally terminating at filter material outer peripheral edge 14.

A first connecting web 34 extends between inner ends 30 of ribs or fingers 24, 26 and 28 of each set 22 for connecting the ribs together. A second connecting web 36 extends generally radially from each set 22 to support rim 20 for connecting the individual sets to the support rim. In the preferred arrangement shown in FIG. 1, second connecting webs 36 generally comprise a radial extension of an end one of the ribs in each rib set 22 and, more particularly, comprise extensions of ribs 24.

As shown in FIG. 2, support rim 20 and rib 24 have a slightly greater cross-sectional area than second connecting web 36. This is to facilitate ease of bending between rib sets 22 and the support rim when the filter construction is inserted into a filter basket as will be described. For a filter construction which may be used in conjunction with most home type drip coffeemakers and which typically has a diameter of approximately 10", support rim 20 and ribs 24, 26 and 28 are generally square in cross-section and measure approximately 1/16" on a side. Second connecting web 36 is also square but somewhat smaller in dimension, measuring approximately 0.020" to 0.030" on a side. However, these dimensions may be varied as necessary or desired without in any way departing from the overall intent or scope of the present invention. Also in the preferred embodiment, each rib set 22 is comprised of three ribs with a total of ten such sets spaced radially around rim 20. With such a construction, all the ribs are spaced apart from the next adjacent ribs by angles of approximately 12°. This too may be varied as desired along with the other design parameters without in any way departing from the overall intent or scope of the invention.

In the preferred construction, central portion or support rim 20 and rib or finger sets 22 of web or skeleton B are constructed from polypropylene, although other plastics and materials could also be advantageously employed. The skeleton may be integrally molded so as to include rim 20, rib sets 22, first connecting webs 34 and second connecting webs 36 as a single piece construction or may be fabricated from several pieces. The precise method of manufacture may, to some extent, be dictated by the specifics of the intended filter application. For purposes of use in cofeemakers, it is particularly desired that the skeleton be non-absorbent and also be fairly rigid to give form to the overall filter construction. In addition, the material should be heat bondable to filter material A since this is the preferred form of affixing the web or skeleton B to the filter material. While some types of glues may be acceptable, their use is purposely avoided in conjunction with beverages to eliminate any possible distortion of beverage taste. In addition to heat bonding, other types of mechanical bonding arrangements could be satisfactorily employed.

FIG. 3 shows the filter construction of FIG. 1 as it is being inserted into a filter basket for a drip type coffeemaker. In FIG. 3, the filter basket is generally designated 50 and has a cup-shaped configuration with a generally circular open top end 52 and a side wall 54 which tapers inwardly from the top end toward a generally circular bottom wall or end 56. A handle 58 is conveniently affixed to side wall 54 for ease of installing and removing the filter basket from operative communication with coffee brewing apparatus. Bottom end or wall 56 includes one or more openings generally centrally thereof for purposes of allowing coffee to flow therethrough into a container or carafe spaced immediately thereunder. Filter basket 50 may, of course, take a variety of shapes and forms and be constructed from a variety of materials. However, the general showing of FIG. 3 should allow those skilled in the art to readily appreciate the inventive aspects of the new filter construction. At installation, filter material inner face 10 faces upwardly from the filter basket with support rim 20 and rib sets 22 of web or skeleton B which are bonded to outer surface 12 facing downwardly toward the filter basket. The filter itself is normally in a flat condition as shown in FIGS. 1 and 3 in order to facilitate ease of packing and storage and to substantially reduce the necessary shelf space required for such storage. The filter is simply pushed into the filter basket in the direction of arrow a until it is positioned as generally shown in FIG. 4.

With specific reference to FIG. 4 and with the filter fully received in filter basket 50, web or skeleton B is disposed on the outside of the filter so that the coffee granules and grounds will not be placed in direct contact therewith. Support rim 20 is circular and has a diameter generally the same or slightly smaller than the diameter of filter basket bottom end or wall 56. As shown, rib or finger sets 22 are bent upwardly from support rim 20 at the area of first connecting webs 34 in order to generally assume the same cup-like configuration of the filter basket.

Since the filter is being folded from a generally flat condition to a generally cup-shaped condition, there will be some excess filter material. Due to the relative rigidity of the individual ribs 24, 26 and 28 as compared to filter material A, this excess will appear as folds generally designated 62 between the end ribs 24, 28 of adjacent rib sets 22. These folds extend generally radially inwardly from filter material outer peripheral edge 14 to the area of support rim 20 and are automatically formed as the filter is being inserted. Thus, the filter construction may be fairly categorized as self-folding. Moreover, since the natural or normal condition for the filter is generally flat, the natural resiliency of second connecting webs 36 will urge rib sets 22 toward engagement with filter basket side wall 54 at least at and adjacent open top end 52. This, in turn, aids in moving folds 62 to a generally flat condition so that the overall filter construction will conform to the cup-shaped filter basket when inserted thereinto.

The generally circular configuration of the filter when it is in the flat condition also advantageously maximizes the surface area of filter material available for filtering purposes when the filter is placed in filter basket 50 in the manner described above. This then generally duplicates the filter surface area present in the known types of fluted paper filters. A maximum surface area is desirable since it is this surface area which governs the overall filter efficiency.

Figure 5:
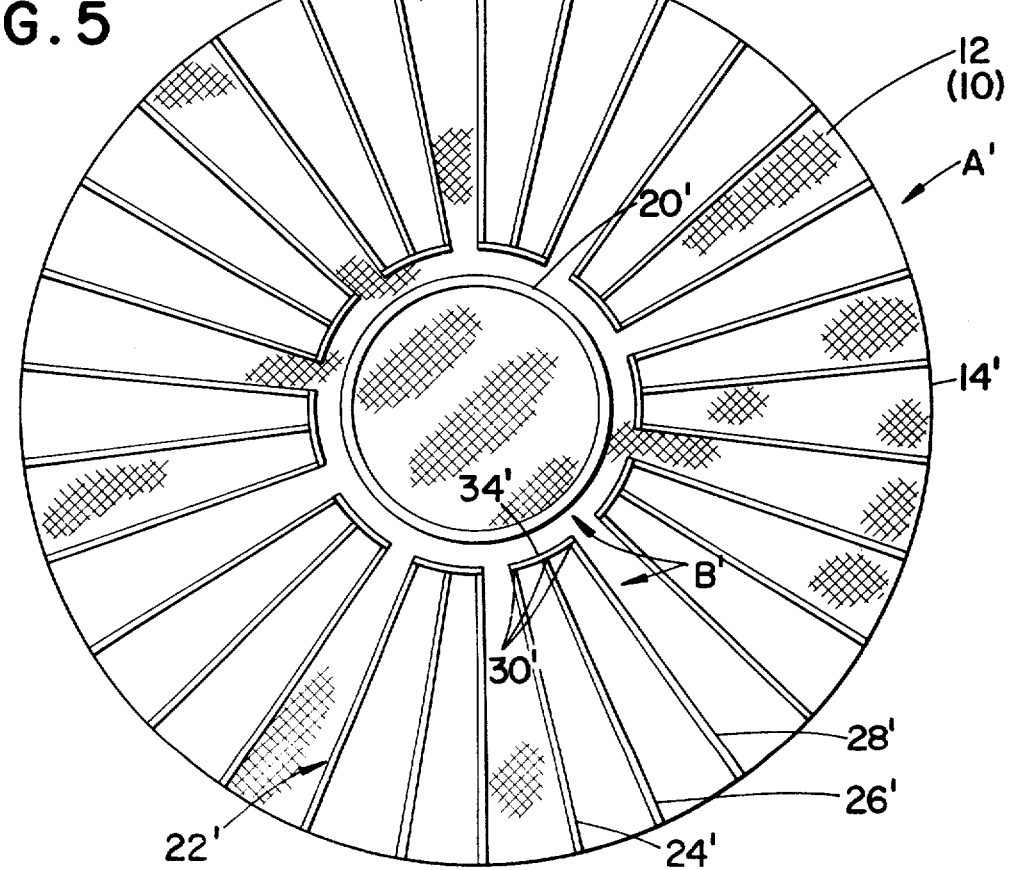

FIG. 5 shows a slightly modified version of the filter hereinabove described. For ease of illustration and appreciation of this alternative, like components are identified by like numerals with the addition of a primed (') suffix and any new components are identified by new numerals.

In FIG. 5, filter material A' again has a generally circular configuration with an outer peripheral edge 14'. Here, rib or finger sets have ribs 24', 26' and 28' which extend radially of center portion or support rim 20' and terminate at or adjacent peripheral edge 14'. A first connecting web 34' connects ribs 24', 26' and 28' of each rib set 22' together adjacent the innermost ends 30' thereof. Here, however, there is no interconnection between finger sets 22' and support rim 20'. Use of this alternative embodiment is the same as previously described hereinabove with reference to FIGS. 3 and 4. The only difference in this alternative embodiment is the fact that any resilient outward force otherwise obtained by means of the second connecting web is not provided. Even without the inclusion of the second connecting webs, however, this embodiment has provided wholly adequate and acceptable operational results.

After either one of the above two described filter embodiments has been used for making a pot or cup of coffee, it may be conveniently removed from the filter basket for disposing of the coffee grounds. Thereafter, the filter may be washed or otherwise cleaned for subsequent reuse at the next occasion of coffee brewing. The construction and materials employed for the filter construction facilitate such reuse for extended periods of time without physical deterioration and/or without adversely affecting the quality or taste of the coffee.

While the embodiments of the filter which have been disclosed above utilize ribs or fingers in each finger or rib set and further utilize ten such sets equidistantly spaced around the support rim, these numbers and spacings may be varied as deemed necessary or appropriate to accommodate particular filter applications. For example, and for smaller sized filters, it may be desirable to only include two ribs per rib set while for larger sized filters, it may be desirable to include a greater number of ribs per set. For use in typical coffeemakers, it is desired that a sufficient number of ribs per rib set be included so that the folds generated in the filter material when it is moved from a generally flat to a generally cup-shaped condition will at least substantially lay against the filter basket side wall. If an insufficient number of ribs are provided, the folds will have a tendency to generate a somewhat wave-like configuration around the filter basket side wall. Such a configuration is undesirable in that it may allow hot water injected into the filter basket to pass between the filter and filter basket side wall without first contacting the coffee granules.

For applications of the filter concepts disclosed hereinabove to other liquid filtering applications, the number and orientation of the rib or finger sets may be appropriately varied. Also, the specific configuration of the skeleton central portion or support ring may be varied as necessary to accommodate these other filtering applications. It is further possible to, for example, connect skeleton ribs or fingers directly to the skeleton central portion or support rim. These modifications are in no way deemed to depart from the overall intent or scope of the present invention.

The invention has been described with reference to the preferred and alternative embodiments. Obviously, modifications and alterations will occur to others upon the reading and understanding of the specification. It is our intention to include all such modifications and alterations insofar as they come within the scope of the appended claims or the equivalents thereof.

Having thus described our invention, we now claim:

1. A permanent, reuseable beverage filter which is self-folding between a first generally flat storage condition and a second generally cup-shaped filtering condition as it is inserted into a generally cup-shaped filter support, said filter comprising:

a thin flexible filter material having opposed faces, an outer peripheral edge and a porosity adapted to filter a beverage passing therethrough to a desired extent; and, a support skeleton affixed to one face of said filter material for giving support thereto in said first condition while allowing selective folding thereof between said first and second conditions, said support skeleton including a central portion generally centrally disposed on said filter material and configured to define a filter bottom area when said filter is received in said filter support and further including a plurality of skeleton ribs at spaced intervals around said central portion extending outwardly thereof toward said filter material outer peripheral edge, said ribs providing support for said filter material outwardly of said skeleton central portion and adapted to provide a generally cup-shaped configuration therefor when said filter is inserted into said filter support, a plurality of adjacent ones of said ribs being connected with one another along the length thereof outwardly of said central portion only by said filter material and not by any portions of said skeleton for providing free movement of such adjacent ribs toward one another when said filter is formed into said cup-shaped condition from said generally flat condition.

2. The filter as defined in claim 1 wherein said skeleton ribs comprise a plurality of rib sets spaced around said central portion with each set including a plurality of adjacent ribs interconnected to each other by at least one first connecting web spaced outwardly of said skeleton central portion, said plurality of adjacent ones of said ribs which are connected with one another only by said filter material being defined by ribs in adjacent ones of said rib sets.

3. The filter as defined in claim 2 wherein said ribs have inner terminal rib ends adjacent said skeleton central portion and outer terminal rib ends adjacent said filter material outer peripheral edge and said first connecting webs are disposed at least adjacent said inner terminal rib ends of the ribs in each said set.

4. The filter as defined in claim 3 wherein each rib set includes at least three ribs.

5. The filter as defined in claim 3 wherein said ribs in each said rib set have said inner terminal rib ends spaced outwardly of said skeleton central portion and each said set is connected to said central portion by a second connecting web.

6. The filter as defined in claim 5 wherein said second connecting webs have a cross-sectional area less than the cross-sectional area of said ribs, said second connecting webs being resiliently bent in said cup-shaped condition of said filter for resiliently biasing said ribs outwardly.

7. The filter as defined in claim 2 wherein said ribs have inner terminal rib ends spaced outwardly from said skeleton central portion and said first connecting webs are disposed at least adjacent said inner terminal rib ends and said second connecting webs generally comprise an extension of one of the ribs in the associated rib set, said second connecting webs urging said filter material and the ribs in each said rib set toward engagement with the side wall of said filter support when said filter is inserted thereinto.

8. A liquid filter comprising: a thin flexible filter material having opposed faces, an outer peripheral edge and a porosity adapted to filter a liquid passing therethrough to some desired extent; and, a support web for supporting said filter material and for providing it with a desired form at least when placed in cooperative communication with some associated structure, said support web including a support rim and a plurality of fingers extending outwardly therefrom toward said filter material outer peripheral edge, at least portions of a plurality of said fingers being resiliently bent for biasing outwardly on said filter material, and said resiliently bent fingers being unrestrained against resilient bending thereof by any portions of said support web for providing free relative movement between said resiliently bent fingers and adjacent fingers in a direction for varying the spacing therebetween.

9. The filter as defined in claim 8 wherein said support rim and fingers are mechanically bonded to said filter material and said filter has a normal generally flat condition at least prior to being placed in cooperative communication with said associated structure.

10. The filter as defined in claim 8 wherein said support web fingers comprise a plurality of finger sets spaced generally around said support rim, each set including a plurality of adjacent fingers interconnected to each other by at least one first connecting web.

11. The filter as defined in claim 10 wherein said first connecting webs are disposed at least adjacent terminal ends of the fingers in the associated set spaced adjacent said support rim.

12. The filter as defined in claim 10 wherein each finger set is connected to said support rim by a second connecting web which aids in providing a desired first normal condition for said filters.

13. The filter as defined in claim 12 wherein said first connecting webs are disposed at least adjacent terminal ends of the fingers in the associated set spaced adjacent said support rim and said second connecting webs each comprise an extension of one of the fingers in the associated set, said second connecting webs continuously urging said filter toward a generally flat condition which comprises said first condition while allowing selective movement thereof into said desired form.

14. The filter as defined in claim 13 wherein said second connecting webs comprise an extension of an endmost one of the fingers in the associated set.

15. The filter as defined in claim 10 wherein each finger set includes at least three fingers spaced apart from each other on said filter material.

16. The filter as defined in claim 10 wherein sad support skeleton is affixed to one face of said filter material with said support rim generally centrally disposed thereon and with said finger sets spaced therearound so as to extend generally radially outward thereof, said support rim defining a bottom area for said filter when it is placed in cooperative communication with some associated structure.

17. A permanent, reuseable liquid filter comprising: a thin flexible filter material having a central portion and an outer peripheral edge, a support skeleton for said filter material and including a plurality of skeleton ribs spaced-apart generally around said central portion and extending outwardly from adjacent said central portion toward said outer peripheral edge, both said filter material and said skeleton being of synthetic plastic material and being heat bonded together.

18. The filter as defined in claim 17 wherein said filter material and ribs are heat bonded together with said filter material in a substantially flat condition, said filter being formable into a generally cup-shaped configuration, at least portions of a plurality of said ribs being resiliently bent when said filter is in said cup-shaped configuration, and each said resiliently bent rib along the length thereof from adjacent said central portion to said peripheral edge being connected with at least one adjacent rib only by said filter material and not by any portion of said skeleton for providing relative movement between each said resiliently bent rib and said adjacent rib in a direction for varying the spacing therebetween.

19. A permanent, reuseable liquid filter comprising: a thin flexible filter material having a central portion, opposed faces, an outer peripheral edge and a porosity adapted to filter a beverage passing therethrough to a desired extent, a support skeleton affixed to at least one said face of said filter material and including a plurality of skeleton ribs spaced-apart generally around said central portion and extending outwardly from adjacent said central portion toward said peripheral edge, said skeleton and filter material being affixed together with said filter material in a substantially flat condition, said filter being formable into a generally cup-shaped condition, at least certain of said ribs having at least portions thereof resiliently bent in said cup-shaped condition of said filter, each said certain resiliently bent rib along the length thereof from adjacent said central portion to said peripheral edge being connected to at least one adjacent rib only by said filter material and not by any portion of said skeleton, whereby each said certain rib is freely movable inwardly and outwardly and toward and away from said adjacent rib for varying the size of said filter in said cup-shaped condition and outward bias of said resiliently bent certain ribs provides automatic conformation of said filter to a filter receiver.

* * * * *